United States Patent
Mayhew et al.

(10) Patent No.: US 10,336,331 B2
(45) Date of Patent: Jul. 2, 2019

(54) HYDRAULIC CONTROL UNIT EMBEDDED ACCUMULATOR CIRCUIT

(71) Applicants: William Mayhew, Ann Arbor, MI (US); Stephen Tokish, Sylvania, MI (US)

(72) Inventors: William Mayhew, Ann Arbor, MI (US); Stephen Tokish, Sylvania, MI (US)

(73) Assignee: FCA US LLC, Auburn Hills, MI (US)

( * ) Notice: Subject to any disclaimer, the term of this patent is extended or adjusted under 35 U.S.C. 154(b) by 144 days.

(21) Appl. No.: 15/664,586

(22) Filed: Jul. 31, 2017

(65) Prior Publication Data
US 2019/0031195 A1  Jan. 31, 2019

(51) Int. Cl.
| | |
|---|---|
| *B60W 30/18* | (2012.01) |
| *B60W 10/06* | (2006.01) |
| *B60W 10/11* | (2012.01) |
| *F16H 61/00* | (2006.01) |
| *B60W 10/115* | (2012.01) |
| *B60W 30/192* | (2012.01) |

(52) U.S. Cl.
CPC ...... *B60W 30/18054* (2013.01); *B60W 10/06* (2013.01); *B60W 10/11* (2013.01); *B60W 10/115* (2013.01); *B60W 30/18027* (2013.01); *B60W 30/192* (2013.01); *F16H 61/0025* (2013.01); *B60W 2510/108* (2013.01); *B60W 2520/04* (2013.01); *B60W 2540/12* (2013.01); *B60W 2710/1005* (2013.01); *B60W 2710/1083* (2013.01); *F16H 2200/0008* (2013.01); *F16H 2200/0065* (2013.01)

(58) Field of Classification Search
CPC .... B60W 10/06; B60W 10/11; B60W 10/115; B60W 30/18027; B60W 30/187054; B60W 30/192; B60W 2710/1083; F16H 61/0025; F16H 61/065; F16H 2061/023; F16H 2061/0488; F16H 2061/062
See application file for complete search history.

(56) References Cited

U.S. PATENT DOCUMENTS

| | | | | |
|---|---|---|---|---|
| 4,362,133 | A | * | 12/1982 | Malik ............... F16D 48/08 123/179.16 |
| 5,038,637 | A | | 8/1991 | Sugano |
| 5,157,608 | A | | 10/1992 | Sankpal et al. |

(Continued)

*Primary Examiner* — Erin D Bishop
(74) *Attorney, Agent, or Firm* — Ralph E. Smith (57) ABSTRACT

A vehicle includes a hydraulic control unit (HCU) having a set of electrically-actuated valves configured to open/close to accumulate a pressurized hydraulic fluid in a hydraulic apply circuit of a first clutch of a transmission; a hydraulic fluid pump mechanically driven by an engine and configured to provide the pressurized hydraulic fluid to the HCU; and a controller configured to: prior to temporarily stopping the engine, control the engine and the HCU such that the pressurized hydraulic fluid accumulates in the hydraulic apply circuit of the first clutch to a desired hydraulic fluid pressure, and upon restarting the engine, control the set of electrically-actuated valves of the HCU to provide the pressurized hydraulic fluid from the hydraulic apply circuit first clutch to a hydraulic apply circuit for a second clutch of the transmission to apply the second clutch and shift the transmission into drive.

16 Claims, 5 Drawing Sheets

(56) References Cited

U.S. PATENT DOCUMENTS

| | | | |
|---|---|---|---|
| 6,093,974 A * | 7/2000 | Tabata | ................... B60K 6/365 |
| | | | 180/65.25 |
| 6,162,147 A | 12/2000 | Moorman | |
| 7,905,807 B2 | 3/2011 | Shimizu et al. | |
| 8,651,990 B2 | 2/2014 | Moorman et al. | |
| 8,857,593 B2 | 10/2014 | Ari et al. | |
| 9,016,454 B2 | 4/2015 | Hemphill et al. | |
| 9,194,486 B2 * | 11/2015 | Rogner | ............... F16D 25/0638 |

* cited by examiner

HYDRAULIC CONTROL UNIT EMBEDDED ACCUMULATOR CIRCUIT

FIELD

The present application generally relates to vehicle transmissions and, more particularly, to a hydraulic control unit (HCU) embedded accumulator circuit.

BACKGROUND

Vehicle transmissions typically include a system of planetary gear sets and hydraulically-actuated clutches. A hydraulic control unit (HCU) controls the supply of hydraulic fluid (e.g., oil) to the various clutches to control a gear (park/neutral/drive) and a drive gear ratio of the transmission. Some engines have start/stop functionality where the engine is temporarily shut off when the vehicle is stopped. The transmission, however, requires hydraulic pressure to immediately shift the transmission into drive upon restart of the engine. Conventional transmission control systems utilize an electric oil pump, which is operable when the engine is off, or a hydraulic fluid accumulator to supply this immediately required hydraulic pressure. Both of these components, however, increase vehicle costs and/or packaging size requirements for the transmission. Accordingly, while these systems work well for their intended purpose, there remains a need for improvement in the relevant art.

SUMMARY

According to one example aspect of the invention, a control system for a start/stop powertrain system of a vehicle comprising an engine and a transmission is presented. In one exemplary implementation, the control system comprises: a hydraulic control unit (HCU) comprising a set of electrically-actuated valves configured to open/close to accumulate a pressurized hydraulic fluid in a hydraulic apply circuit of a first clutch of the transmission, a hydraulic fluid pump mechanically driven by the engine and configured to provide the pressurized hydraulic fluid to the HCU, and a controller configured to: in response to receipt of an engine shut-off request as part of a stop/start functionality of the powertrain system, control the HCU and the engine to remain running for a predetermined period of time such that the pressurized hydraulic fluid accumulates in the hydraulic apply circuit of the first clutch to a desired hydraulic fluid pressure, shut-off the engine upon accumulating the desired hydraulic pressure in the hydraulic apply circuit of the first clutch, upon restarting the engine in response to an engine restart request, control the set of electrically-actuated valves of the HCU to provide the pressurized hydraulic fluid from the hydraulic apply circuit of the first clutch to a hydraulic apply circuit for a second clutch of the transmission to provide the required hydraulic pressure to rapidly apply the second clutch and shift the transmission into drive in an absence of the transmission having a discrete hydraulic fluid accumulator and an electrically-driven oil pump.

In some embodiments, the first clutch is a piston-actuated clutch with a spring. In some implementations, the desired hydraulic fluid pressure is sufficient to actuate the second clutch to shift the transmission into drive. In some implementations, the vehicle does not include a separate hydraulic fluid accumulator. In some implementations, the vehicle does not include an electrically-driven hydraulic fluid pump.

In some implementations, the transmission is a nine-speed front-wheel drive (FWD) automatic transmission and the first clutch is a dog clutch.

According to another example aspect of the invention, a method of operating a start/stop powertrain system of a vehicle comprising an engine and a transmission is presented. In one exemplary implementation, the method comprises: operating, by a controller, the engine, wherein the engine mechanically drives a hydraulic fluid pump configured to provide pressurized hydraulic fluid to a hydraulic control unit (HCU), controlling, by the controller, the HCU to control a flow of pressurized hydraulic fluid in the transmission, wherein the HCU comprises a set of electrically-actuated valves configured to open/close to accumulate the pressurized hydraulic fluid in a hydraulic apply circuit of a first clutch of the transmission, in response to a request to stop the engine as part of a start/stop functionality of the powertrain system: controlling, by the controller, the HCU and the engine to remain running for a predetermined period of time such that the hydraulic fluid pump accumulates the pressurized hydraulic fluid in the hydraulic apply circuit of the first clutch to a desired hydraulic fluid pressure, and shutting-off, by the controller, the engine upon accumulating the desired hydraulic pressure in the hydraulic apply circuit of the first clutch, and in response to a request to restart the engine: restarting, by the controller, the engine, and controlling, by the controller, the set of electrically-actuated valves of the HCU to provide the pressurized hydraulic fluid from the hydraulic apply circuit of the first clutch to a hydraulic apply circuit of a second clutch of the transmission to provide the required hydraulic pressure to rapidly apply the second clutch and shift the transmission into drive in an absence of the transmission having a discrete hydraulic fluid accumulator and an electrically-driven oil pump.

In some implementations, the first clutch is a piston-actuated clutch with a spring. In some implementations, the desired hydraulic fluid pressure is sufficient to actuate the second clutch to shift the transmission into drive. In some implementations, the vehicle does not include a separate hydraulic fluid accumulator. In some implementations, the vehicle does not include an electrically-driven hydraulic fluid pump. In some implementations, the transmission is a nine-speed front-wheel drive (FWD) automatic transmission and the first clutch is a dog clutch. In some implementations, the request to stop the engine is generated when the vehicle is stopped, and the request to restart the engine is generated when a driver of the vehicle releases a brake pedal.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As previously discussed, separate hydraulic fluid accumulators and electrically-driven hydraulic fluid pumps increase vehicle costs, as well as potentially increasing weight/packaging size. Accordingly, systems and methods are presented that embed an accumulator control circuit in the hydraulic control unit (HCU) of a transmission. More specifically, a hydraulic supply circuit of an existing clutch of the transmission is utilized to accumulate pressurized hydraulic fluid immediately prior to stopping the engine. The HCU includes a set of electrically-actuated valves or solenoids for directing the pressurized hydraulic fluid from the mechanically-driven hydraulic fluid pump to the hydraulic supply circuit. Upon restarting the engine, these electrically-actuated valves of the HCU are controlled to release the pressurized hydraulic fluid from the hydraulic supply circuit and direct the pressurized hydraulic fluid accordingly to shift the transmission into drive. In addition to a smoother and/or faster restart operation (e.g., decreased noise/vibration/harshness), these systems and methods potentially decreases vehicle costs, weight, and/or packaging size.

Figure 1:
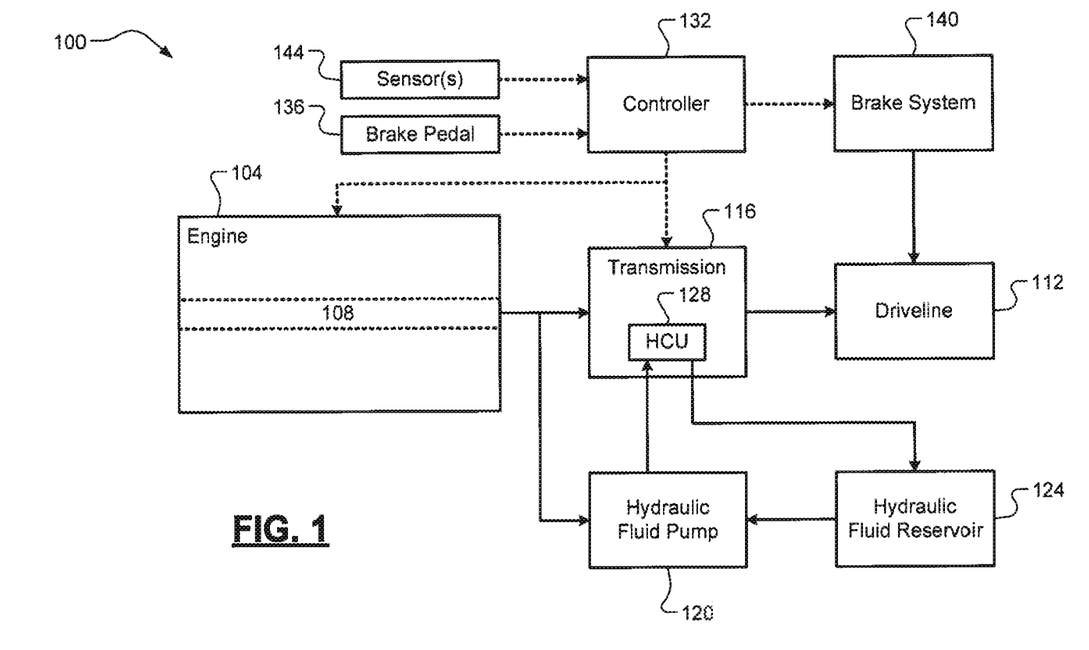
FIG. 1 is a diagram of an example vehicle comprising an engine and a transmission according to the principles of the present disclosure.

Referring now to FIG. 1, a diagram of an example vehicle 100 is illustrated. The vehicle 100 comprises an engine 104 that combusts an air/fuel mixture within cylinders to drive pistons and generate drive torque at a crankshaft 108. The drive torque is transferred from the crankshaft 108 to a driveline 112 of the vehicle 100 by a transmission 116. In one exemplary implementation, the transmission is a nine-speed front-wheel drive (FWD) automatic transmission comprising at least one dog clutch that is utilized to store the pressurized hydraulic fluid according to the techniques discussed herein. The drive torque at the crankshaft 108 also mechanically drives a hydraulic fluid pump 120. The hydraulic fluid pump 120 pumps hydraulic fluid (e.g., oil) from a sump or reservoir 124 and to a hydraulic control unit (HCU) 128 of the transmission 116. While shown as being part of the transmission 116, it will be appreciated that at least a portion of the HCU 128 could be external to the transmission 116.

A controller 132 controls operation of the vehicle 100, including, but not limited to, operation of the engine 104 (air/fuel/spark) and start-stop operation of the engine 104. Start-stop operation involves the controller 132 temporarily stopping the engine 104 during certain operating conditions, such as when the vehicle 100 is stopped and a brake pedal 136, which controls a brake system 140, is depressed at least a threshold amount. When the brake pedal 136 is released (e.g., depressed less than the threshold amount), the controller 132 restarts the engine 104. It will be appreciated that the vehicle 100 could include other components/systems for assisting in restarting the engine 104, such as a belt-driven starter generator (BSG) unit. The controller 132 also receives data from a set of sensors 144, such as a vehicle speed sensor or transmission output shaft speed sensor that measures vehicle speed. The controller 132 is further configured to implement the techniques of the present disclosure as part of engine start/stop operations, which is discussed in greater detail below.

Figure 2A:
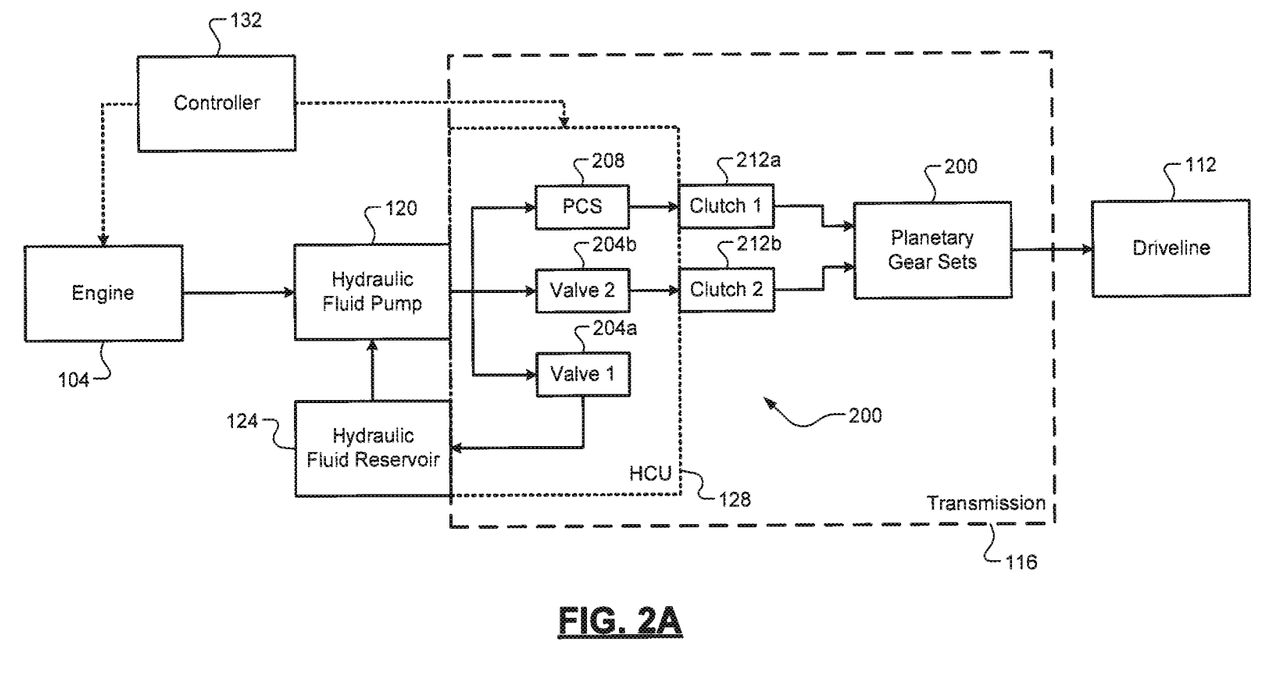
FIGS. 2A-2B are diagrams of example configurations for a hydraulic control unit (HCU) and a hydraulic apply circuit of the transmission according to the principles of the present disclosure.

Referring now to FIG. 2A, an example configuration 200 for the HCU 128 is illustrated. The controller 132 controls the HCU to engage/disengage planetary gear sets 200 to achieve a desired gear and gear ratio for the transmission 116. As shown, the HCU 128 comprises a first valve 204a (Valve 1) and a second valve 204b (Valve 2). The HCU 128 also comprises a pressure control solenoid (PCS) 208 associated with a first clutch 212a (Clutch 1), e.g., a dog clutch, as well as a second clutch 212b (Clutch 2). The valves 204a, 204b and the PCS 208 may be collectively referred to as "a set of electrically-actuated valves." It will be appreciated that the hydraulic fluid pump 120 and/or the hydraulic fluid reservoir 124 could be fully or semi-integrated in the transmission 116, e.g., in the HCU 128. In one exemplary implementation, the first clutch 212a is a piston-actuated clutch with a spring (e.g., a spring-loaded, piston-actuated clutch). Each of the valves/solenoids is electronically controlled by signals from the controller 132. The controller 132 also controls the engine 104, which in turn drives the hydraulic fluid pump 120. It will be appreciated that the HCU 128 could further comprise other valves/solenoids/clutches, but the depicted components are sufficient for describing the disclosed techniques. It will also be appreciated that there is not a separate hydraulic fluid accumulator or an electric hydraulic fluid pump.

Figure 4:
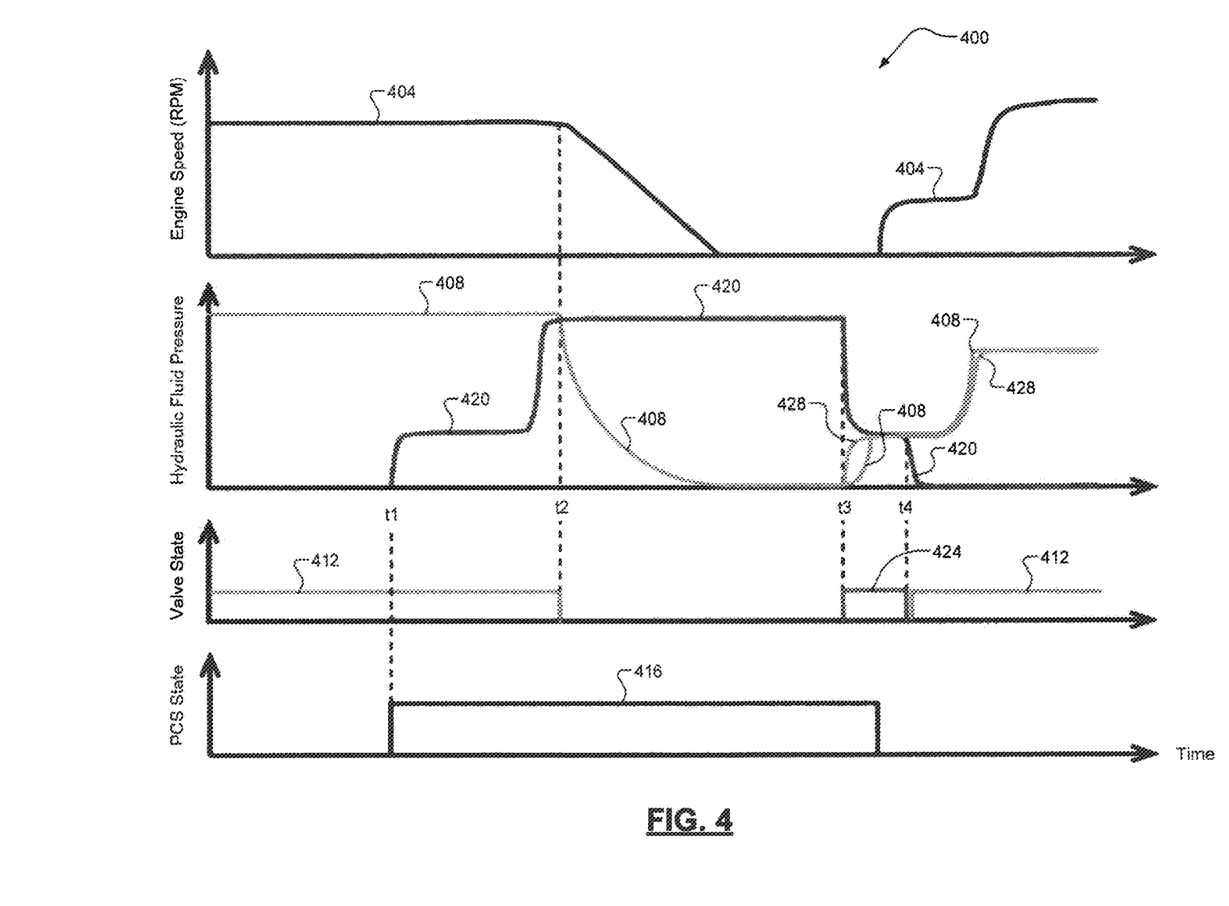
FIG. 4 is a timing diagram of the method of operating the vehicle according to the principles of the present disclosure.

Each of the first and second valves 204a and 204b and the PCS 208 are in fluid communication with the hydraulic fluid pump 120. The first valve 204a is also in fluid communication with the hydraulic fluid reservoir 124 and is utilized to exhaust the hydraulic fluid from the HCU 128 and back to the hydraulic fluid reservoir 124. The second valve 204b is in fluid communication with the second clutch 212b and is utilized to provide pressurized hydraulic fluid to the a hydraulic apply circuit of the second clutch 212b, which in turn is utilized to shift the transmission 116 into drive. The PCS 208 is in fluid communication with the first clutch 212a and is utilized to temporarily store pressurized hydraulic fluid in a hydraulic apply circuit of the first clutch 212a. This stored pressurized hydraulic fluid, for example, could then be depleted from the hydraulic apply circuit for the first clutch 212a and provided to the hydraulic apply circuit for the second clutch 212b by controlling the PCS 208 and the second valve 204b. FIG. 4, which is discussed in greater detail below, further illustrates the example operation of these components.

Figure 2B:
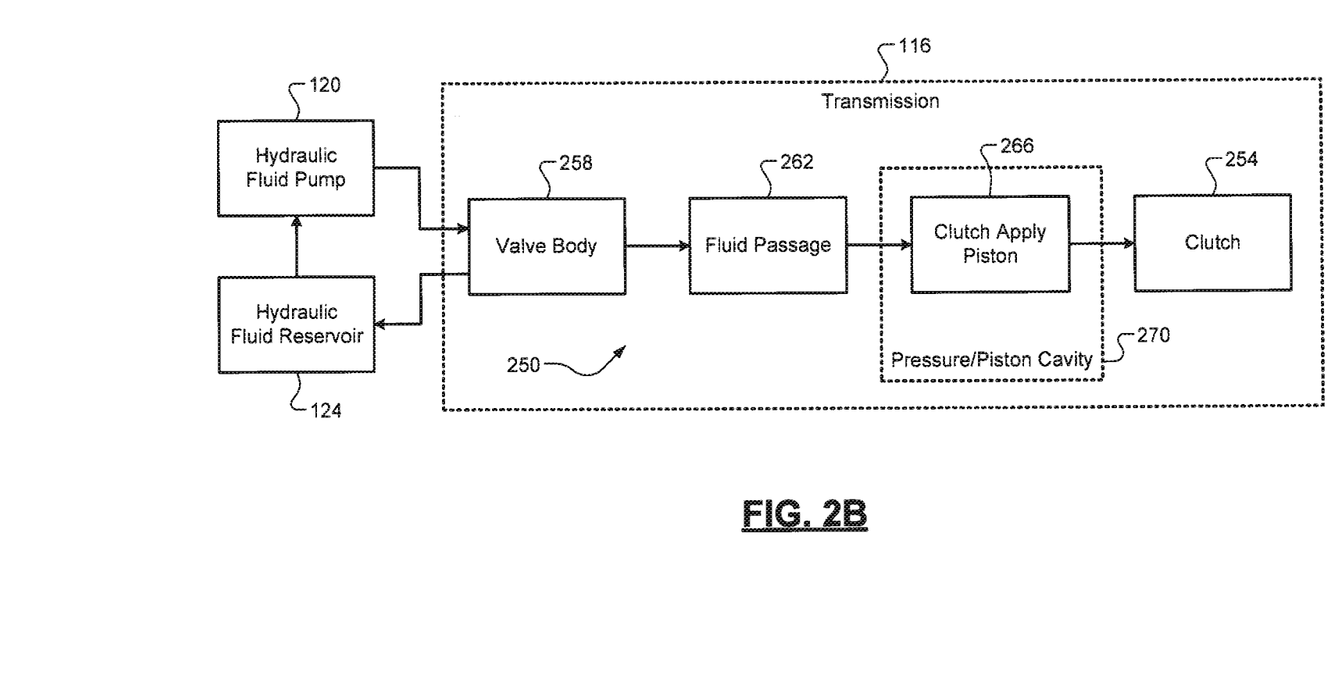

While not specifically shown in FIG. 2A, it will be appreciated that the term "hydraulic apply circuit" as used herein refers to a portion of the transmission's valve body (e.g., the HCU 128) as well as a clutch apply piston disposed within a pressure or piston cavity inside the transmission 116 and passages from the transmission's valve body to each respective piston cavity. In other words, the hydraulic apply circuit refers to the system utilized to provide pressurized hydraulic fluid to the clutch apply piston, which in turn exerts a force on the clutch (e.g., clutch 212a or 212b) to apply the clutch. FIG. 2B illustrates an example hydraulic apply circuit 250 for an example clutch 254. As noted above, the hydraulic apply circuit 250 comprises a portion of a valve body 258 of the transmission 116, a fluid passage 262 through the transmission 116, and a clutch apply piston 266 disposed in a pressure or piston cavity 270 in the transmission 116. The pressure or piston cavity 270 is where the pressurized hydraulic fluid is accumulated as part of the techniques of the present disclosure. It will also be appreciated that illustrated components (e.g., FIG. 2A) are positioned downstream of any significant leakage or any fluid power sources.

Figure 3:
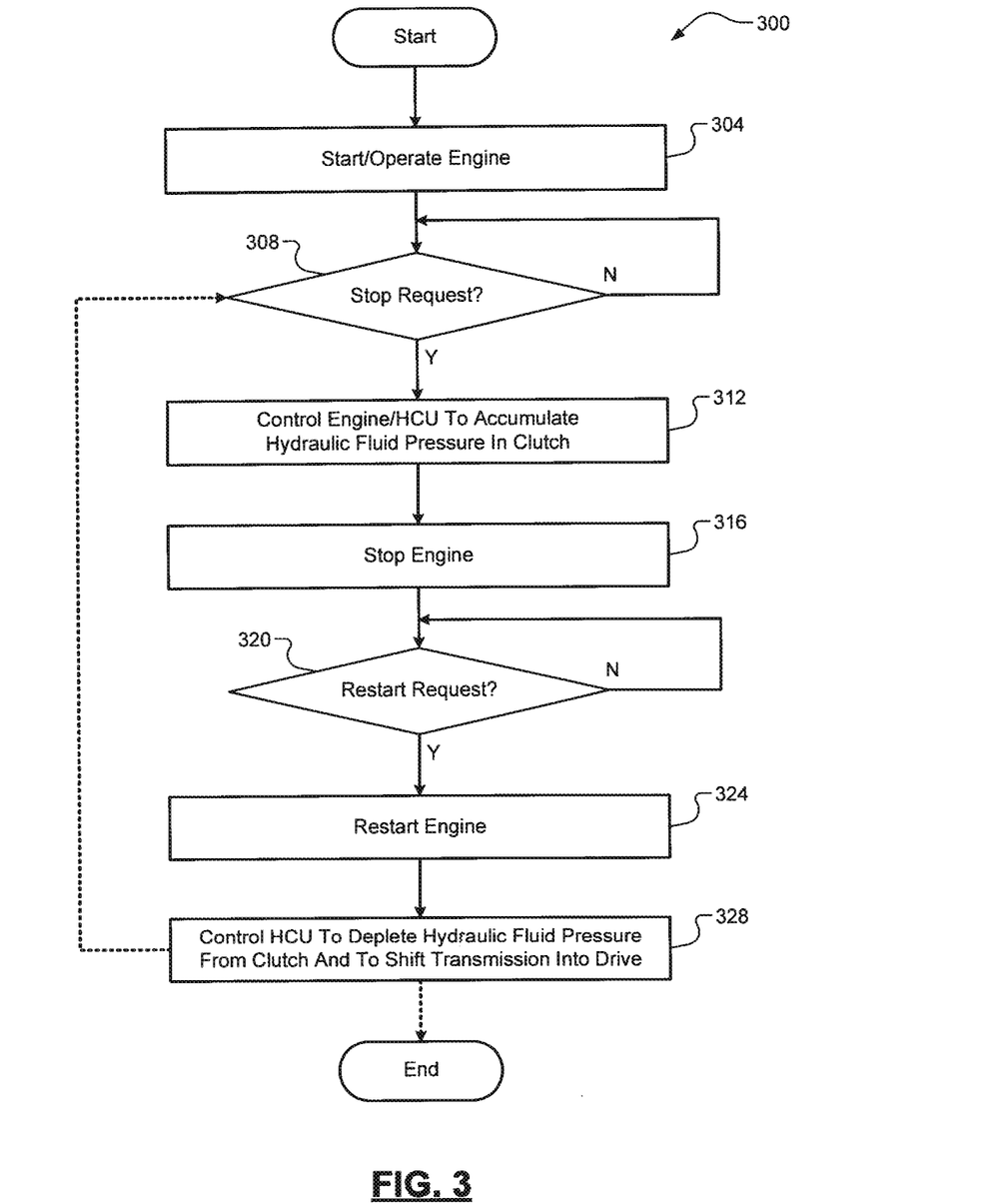
FIG. 3 is a flow diagram of an example method of operating the vehicle according to the principles of the present disclosure.

Referring now to FIG. 3, a flow diagram of an example method 300 of operating the vehicle 100 is illustrated. At 304, the controller 132 starts and operates the engine 104 for a period. At 308, the controller 132 detects for a request to stop the engine 104. When the stop request is detected, the method 300 proceeds to 312. At 312, the controller 132 controls the engine 104 and the HCU 128 (e.g., the PCS 208) such that the hydraulic fluid pump 120 accumulates the pressurized hydraulic fluid in the hydraulic apply circuit first clutch 212a to a desired hydraulic fluid pressure. This desired hydraulic fluid pressure is a hydraulic fluid pressure that is sufficient to shift the transmission 116 into drive. In some implementations, this could be a maximum hydraulic fluid pressure for the hydraulic apply circuit of the first clutch 212a. At 316, the controller 132 stops the engine 104.

At 320, the controller 132 detects for a request to restart the engine 104. When the restart request is detected, the method 300 proceeds to 324. At 324, the controller 132 restarts the engine 104. At 328, the controller 132 controls the HCU 128 (e.g., the PCS 208 and the second valve 204b) to shift the transmission 116 into drive. For example, this could include opening the second valve 204b and closing the PCS 208 to deplete the hydraulic fluid pressure stored in the hydraulic apply circuit of the first clutch 212a, which in turn pressurizes the hydraulic apply circuit of the second clutch 212b, which actuates the second clutch 212b and engages a drive gear ratio via the planetary gear sets 200. The hydraulic fluid pump 120 eventually begins providing pressurized hydraulic fluid to the HCU 128, and normal operation can resume. The method 300 then ends or returns to 308 for one or more additional cycles.

Referring now to FIG. 4, a timing diagram 400 of the method 300 is illustrated. The timing diagram 400 comprises four different plots: engine speed, hydraulic fluid pressures, valve states, and PCS state at various times. Prior to time t1, the engine 104 is running (curve 404), the hydraulic fluid pump 120 is providing pressurized hydraulic fluid (curve 408), and the first valve 204a is open (curve 412) to exhaust hydraulic fluid from the HCU 128. At time t1, the engine stop request is detected and the PCS 208 is opened (curve 416), which causes pressurized hydraulic fluid to accumulate in the hydraulic apply circuit of the first clutch 212a (curve 420). At time t2, the hydraulic fluid pressure accumulated in the hydraulic apply circuit of the first clutch 212a reaches a desired hydraulic fluid pressure and the engine 104 is stopped and the first valve 204a is closed. This effectively disconnects or isolates the hydraulic apply circuit of the first clutch 212a from the hydraulic fluid pump 120 and the hydraulic fluid reservoir 124. At time t3, the engine 104 is restarted (engine speed 404 and hydraulic fluid pump pressure 408 begin to increase) and the second valve 204b is opened (curve 424), which causes the pressurized hydraulic fluid to flow from the hydraulic apply circuit of the first clutch 212a to the hydraulic apply circuit of the second clutch 212b (curve 428), thereby apply the second clutch 212b to initiate the shift of the transmission 116 into drive. The PCS 208 is subsequently closed at or shortly after time t3. At time t4, the second valve 204b is closed and the first valve 204a is opened, completing the shift of the transmission 116 into drive.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture. It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for a start/stop powertrain system of a vehicle including an engine and a transmission, the control system comprising:
 a hydraulic control unit (HCU) having a set of electrically-actuated valves configured to open/close to accumulate pressurized hydraulic fluid in a hydraulic apply circuit of a first clutch of the transmission;
 a hydraulic fluid pump mechanically driven by the engine and configured to provide the pressurized hydraulic fluid to the HCU; and
 a controller configured to:
  in response to receipt of an engine shut-off request as part of a stop/start functionality of the powertrain system, control the HCU and the engine to remain running for a predetermined period of time such that the pressurized hydraulic fluid accumulates in the hydraulic apply circuit of the first clutch to a desired hydraulic fluid pressure,
  shut-off the engine upon accumulating the desired hydraulic pressure in the hydraulic apply circuit of the first clutch, and
  upon restarting the engine in response to an engine restart request, control the set of electrically-actuated valves of the HCU to provide the pressurized hydraulic fluid from the hydraulic apply circuit of the first clutch to a hydraulic apply circuit for a second clutch of the transmission to provide the required hydraulic pressure to rapidly apply the second clutch and shift the transmission into drive in an absence of the transmission having a discrete hydraulic fluid accumulator and an electrically-driven hydraulic fluid pump.

2. The system of claim 1, wherein the first clutch is a piston-actuated clutch with a spring.

3. The system of claim 2, wherein the desired hydraulic fluid pressure is sufficient to actuate the second clutch to shift the transmission into drive upon controlling the set of electrically-actuated valves of the HCU to provide the pressurized hydraulic fluid at the desired hydraulic fluid pressure from the hydraulic apply circuit of the first clutch to the hydraulic apply circuit for the second clutch.

4. The system of claim 1, wherein the vehicle does not include a separate hydraulic fluid accumulator.

5. The system of claim 1, wherein the vehicle does not include an electrically-driven hydraulic fluid pump.

6. The system of claim 1, wherein the transmission is a nine-speed front-wheel drive (FWD) automatic transmission and the first clutch is a dog clutch.

7. The system of claim 1, wherein the vehicle does not include a discrete hydraulic fluid accumulator associated with the transmission and does not include an electrically driven hydraulic fluid pump associated with the transmission.

8. The system of claim 7, wherein the transmission is a nine-speed front-wheel drive (FWD) automatic transmission and the first clutch is a dog clutch.

9. A method of operating a start/stop powertrain system of a vehicle including an engine and a transmission, the method comprising:
- operating, by a controller, the engine, wherein the engine mechanically drives a hydraulic fluid pump configured to provide pressurized hydraulic fluid to a hydraulic control unit (HCU) of the transmission;
- controlling, by the controller, the HCU to control a flow of pressurized hydraulic fluid in the transmission, wherein the HCU comprises a set of electrically-actuated valves configured to open/close to accumulate the pressurized hydraulic fluid in a hydraulic apply circuit of a first clutch of the transmission;
- in response to a request to stop the engine as part of a start/stop functionality of the powertrain system:
  - controlling, by the controller, the HCU and the engine to remain running for a predetermined period of time such that the hydraulic fluid pump accumulates the pressurized hydraulic fluid in the hydraulic apply circuit of the first clutch to a desired hydraulic fluid pressure, and
  - shutting-off, by the controller, the engine upon accumulating the desired hydraulic pressure in the hydraulic apply circuit of the first clutch; and
- in response to a request to restart the engine:
  - restarting, by the controller, the engine, and
  - controlling, by the controller, the set of electrically-actuated valves of the HCU to provide the pressurized hydraulic fluid from the hydraulic apply circuit of the first clutch to a hydraulic apply circuit of a second clutch of the transmission to provide the required hydraulic pressure to rapidly apply the second clutch and shift the transmission into drive in an absence of the transmission having a discrete hydraulic fluid accumulator and an electrically-driven hydraulic fluid pump.

10. The method of claim 9, wherein the first clutch is a piston-actuated clutch with a spring.

11. The method of claim 10, wherein the desired hydraulic fluid pressure is sufficient to actuate the second clutch to shift the transmission into drive.

12. The method of claim 9, wherein the vehicle does not include a separate hydraulic fluid accumulator.

13. The method of claim 9, wherein the vehicle does not include an electrically-driven hydraulic fluid pump.

14. The method of claim 9, wherein the transmission is a nine-speed front-wheel drive (FWD) automatic transmission and the first clutch is a dog clutch.

15. The method of claim 9, wherein the request to shut-off the engine is generated when the vehicle is stopped, and wherein the request to restart the engine is generated when a driver of the vehicle releases a brake pedal.

16. The method of claim 9, wherein the vehicle does not include a discrete hydraulic fluid accumulator associated with the transmission and does not include an electrically driven hydraulic fluid pump associated with the transmission.

* * * * *